Dec. 5, 1933.   W. G. REYNOLDS   1,937,979
BOOK STITCHING AND FOLDING MACHINE
Filed Feb. 4, 1933    8 Sheets-Sheet 1
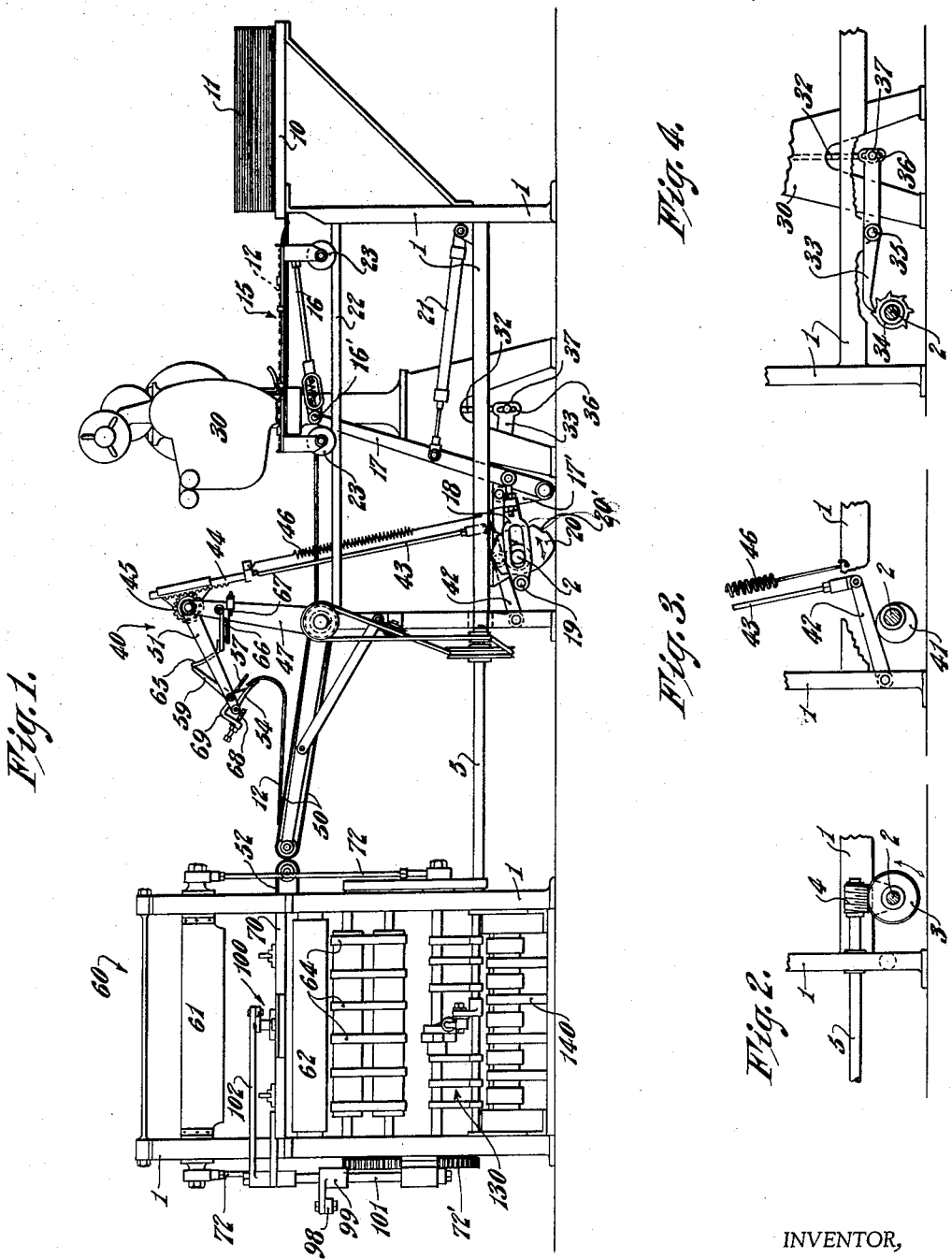
INVENTOR,
Wellington G. Reynolds,
BY
Harry W. Bowen,
ATTORNEY.

Dec. 5, 1933.  W. G. REYNOLDS  1,937,979
BOOK STITCHING AND FOLDING MACHINE
Filed Feb. 4, 1933  8 Sheets-Sheet 2
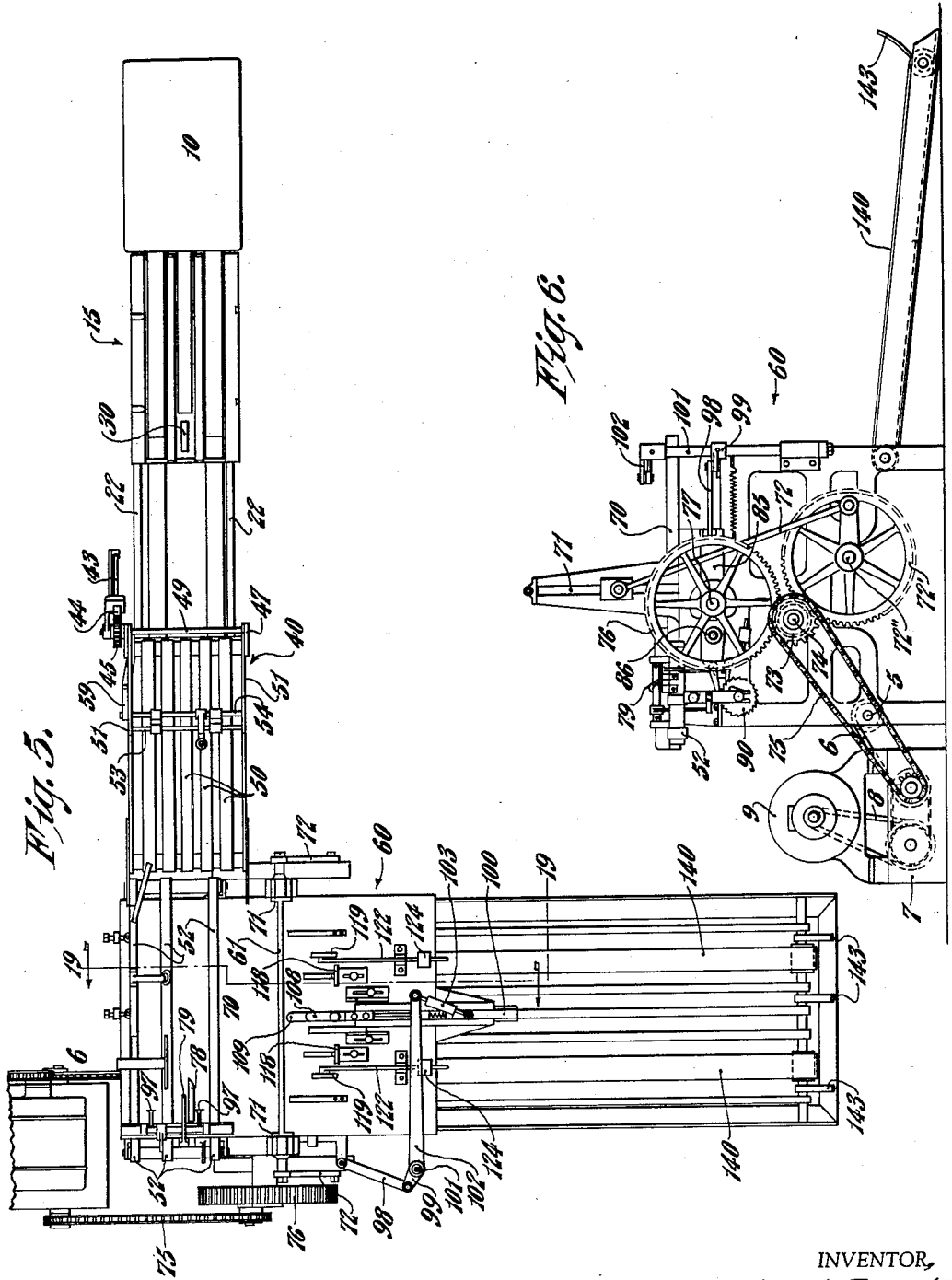
INVENTOR,
Wellington G. Reynolds,
BY
Harry W. Bowen.
ATTORNEY.

Dec. 5, 1933. W. G. REYNOLDS 1,937,979
BOOK STITCHING AND FOLDING MACHINE
Filed Feb. 4, 1933 8 Sheets-Sheet 3
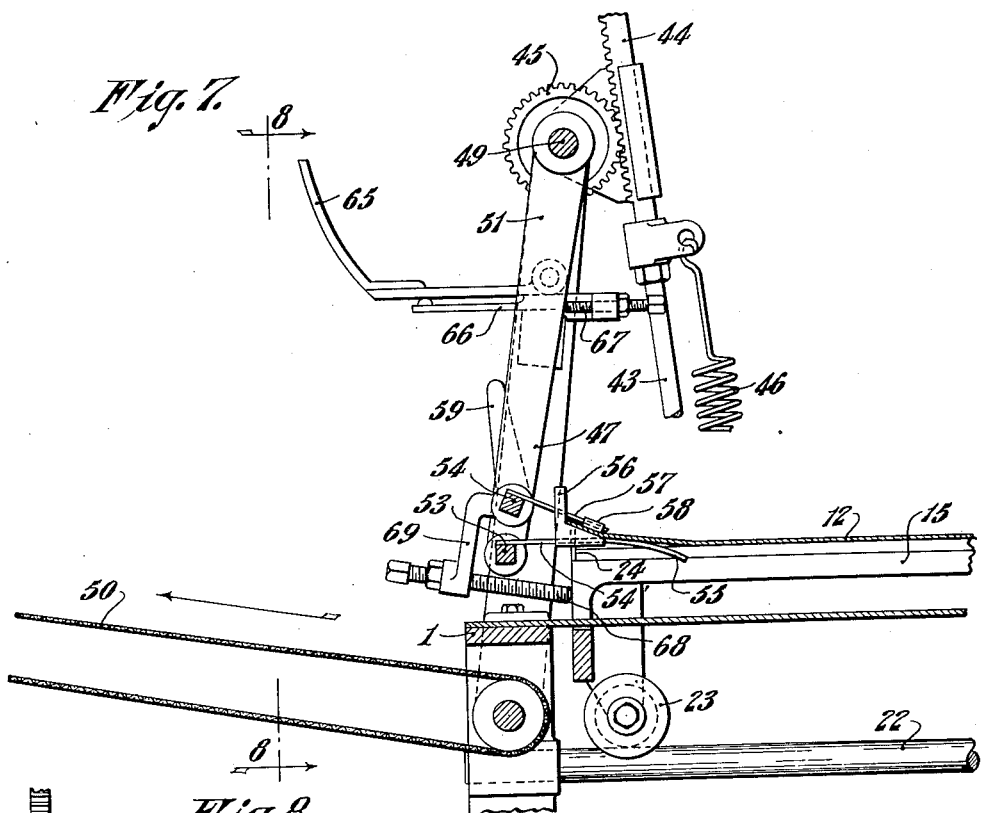
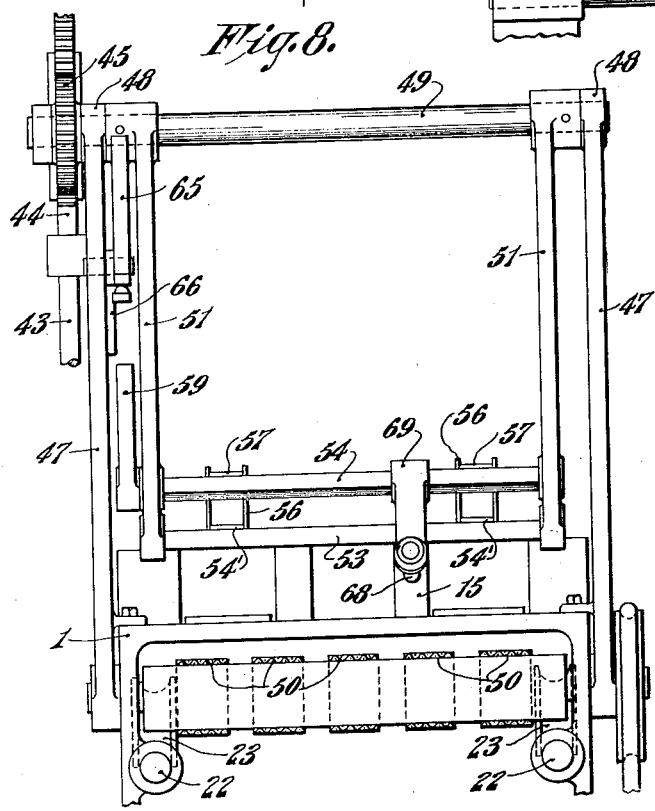
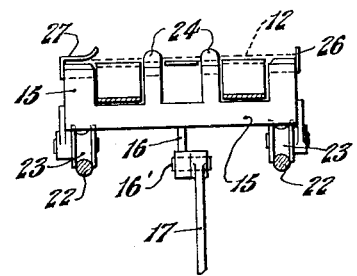
INVENTOR,
Wellington G. Reynolds,
BY Harry W. Bown
ATTORNEY.

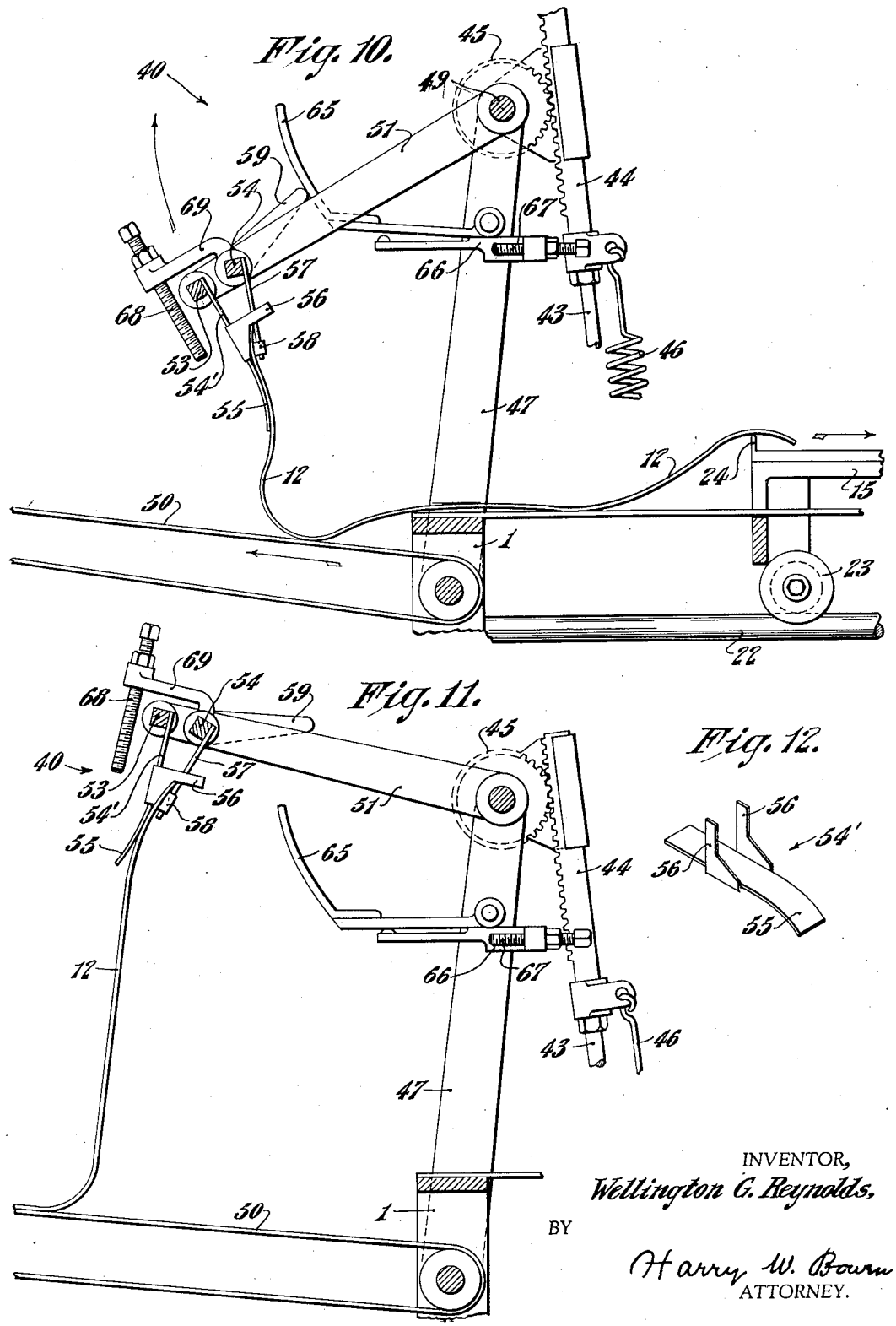

Dec. 5, 1933.  W. G. REYNOLDS  1,937,979
BOOK STITCHING AND FOLDING MACHINE
Filed Feb. 4, 1933  8 Sheets-Sheet 5
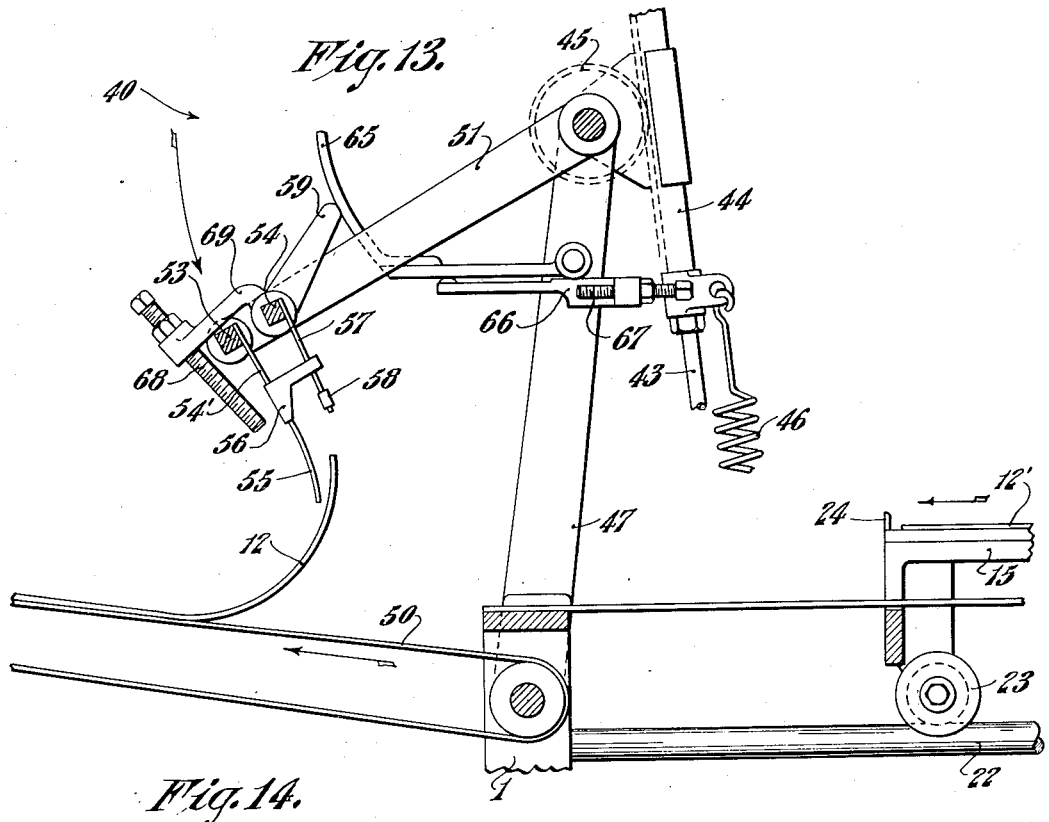
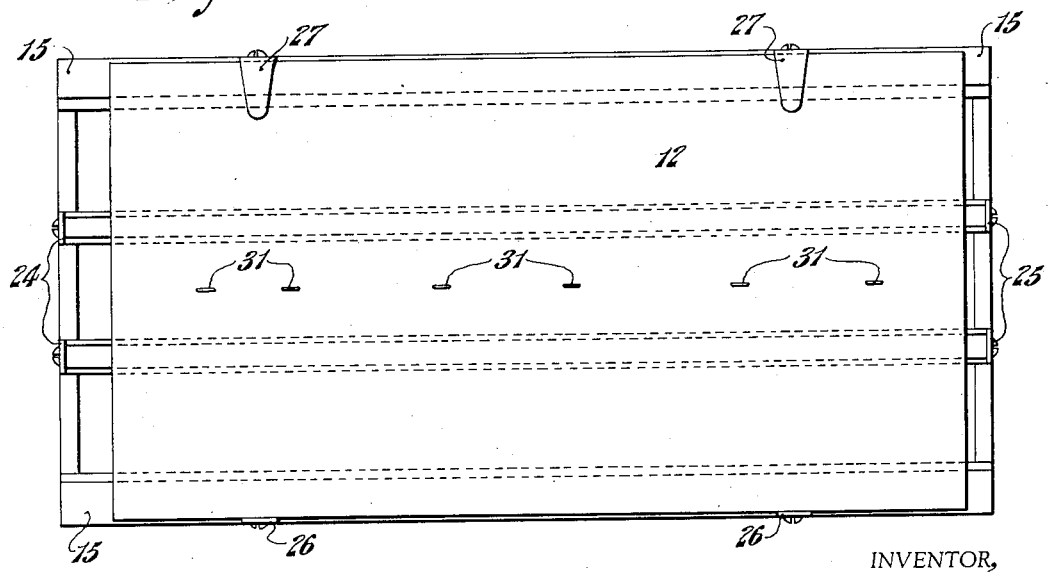
INVENTOR,
Wellington G. Reynolds,
BY
Harry W. Bowen
ATTORNEY.

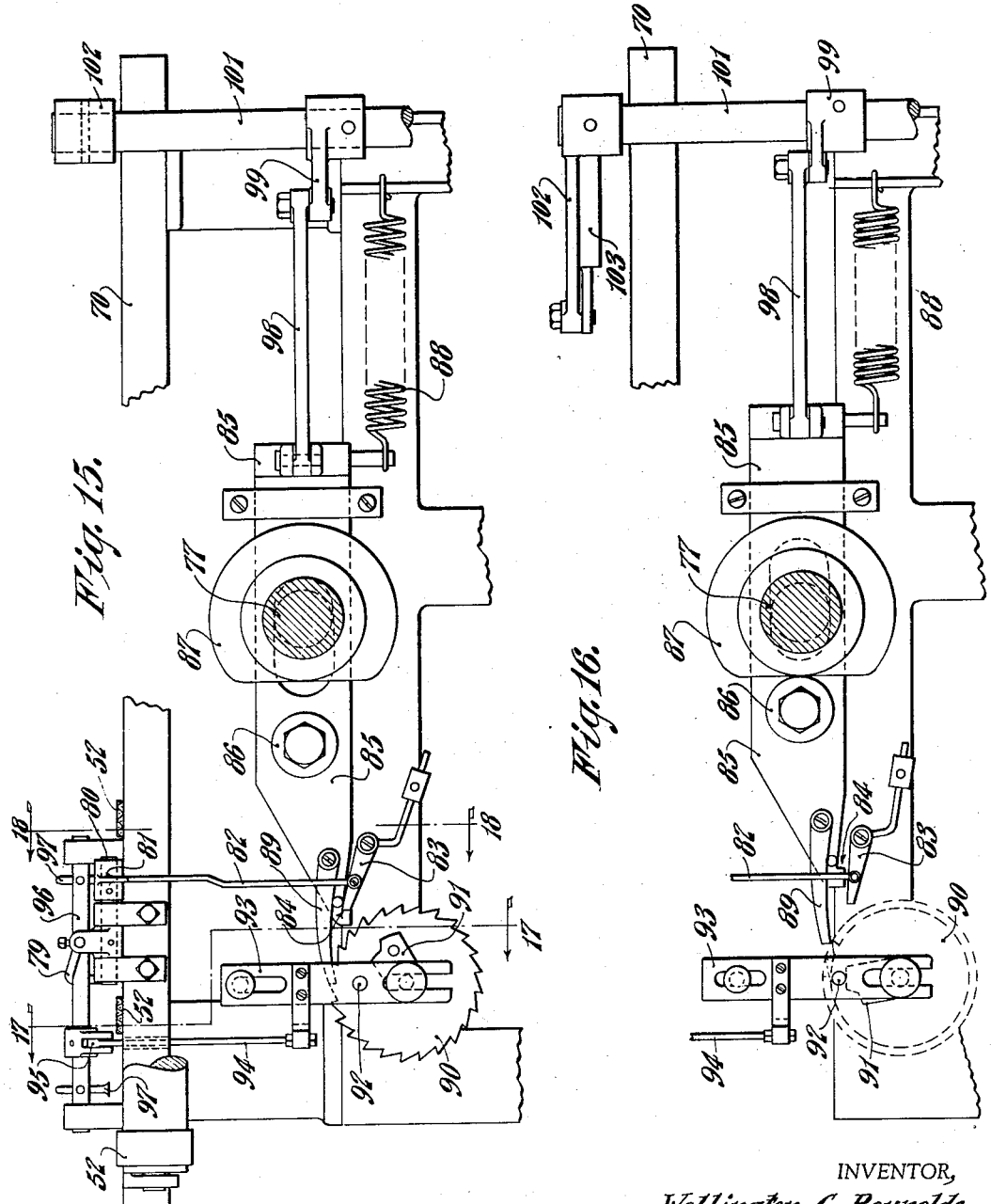

Dec. 5, 1933.                W. G. REYNOLDS                1,937,979
                    BOOK STITCHING AND FOLDING MACHINE
                    Filed Feb. 4, 1933        8 Sheets-Sheet 7

INVENTOR,
Wellington G. Reynolds,
BY
Harry W. Bowen
ATTORNEY.

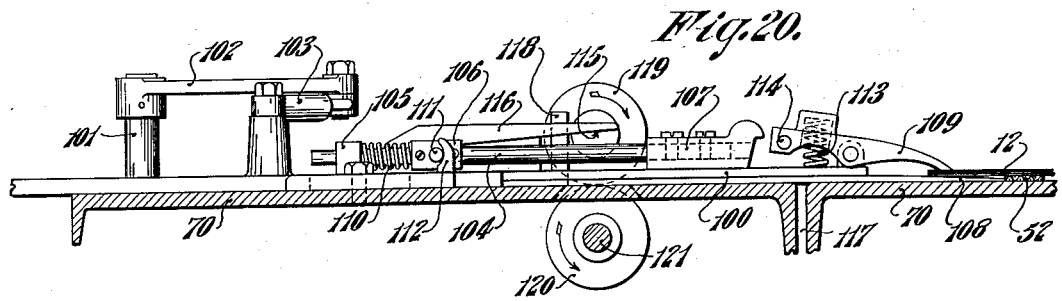
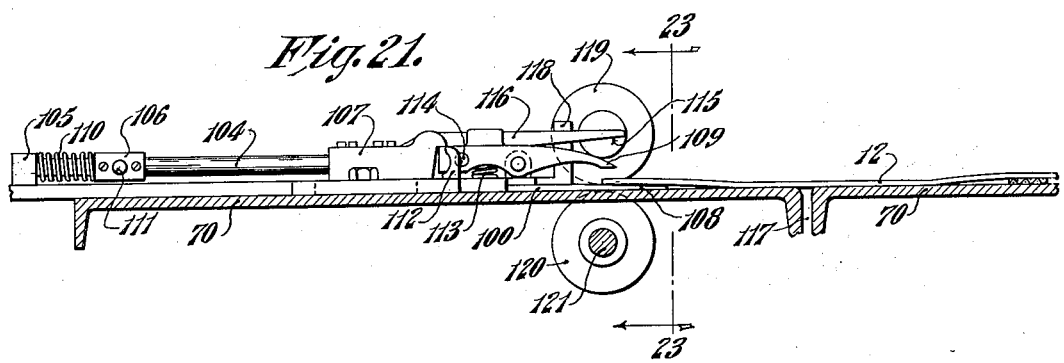
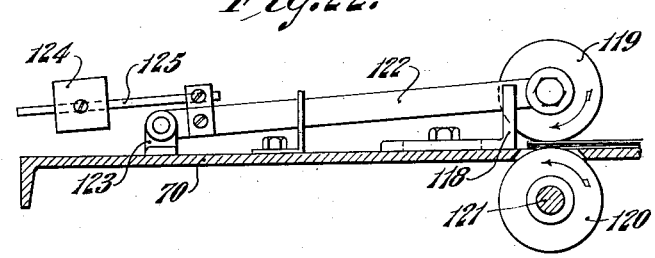
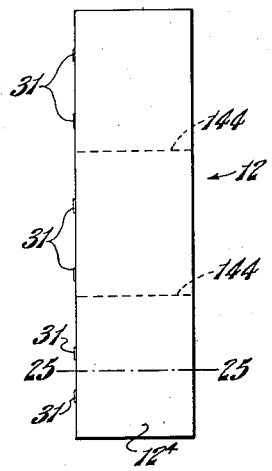
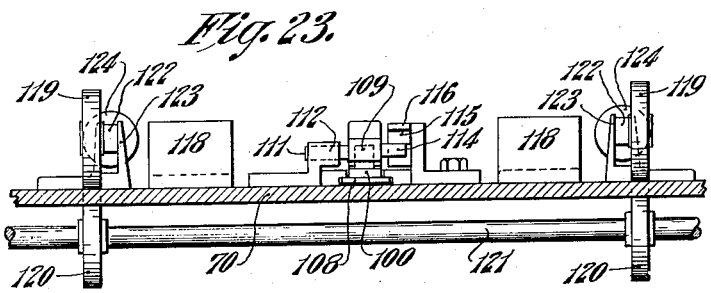

Patented Dec. 5, 1933

1,937,979

UNITED STATES PATENT OFFICE 1,937,979

BOOK STITCHING AND FOLDING MACHINE

Wellington George Reynolds, Holyoke, Mass.

Application February 4, 1933. Serial No. 655,167

19 Claims. (Cl. 270—37)

This invention relates to improvements in book stitching and folding machines, and more particularly to that type of machine which is intended for use in the manufacture of blank books and note books.

An object of the invention is to provide a machine which automatically binds the books with metal stitches, as staples; folds them after the binding operation; counts and stacks the books, all in one continuous operation.

A further object of the invention is to provide means for automatically reversing, or turning over, the book between the operations of stitching and folding.

Still another object of the invention is to provide automatic means for feeding, or conveying, the books from one operating station to another, so that the books pass in orderly continuity through the machine, from beginning to end, without manual handling of any kind.

These and other objects and advantages of my invention will be more fully set forth and described in the ensuing specification, the drawings, and the appended claims.

Broadly, my invention comprises, in combination, a carrier member, means for passing the carrier member through a stitching, or stapling mechanism in periodic movements, means for removing a book by pulling it off of the carrier member and completely turning it over, means for conveying the book onto the table of a folding machine, means for grasping a book and pulling it into a position under the folding mechanism, means for receiving and stacking the folded books, means for counting and positioning the books in any desired multiple, and means for controlling movement of the book-grasping means by the books themselves.

A preferred embodiment of my invention is illustrated in the accompanying drawings, in which:

Fig. 1 is a side elevational view of the complete machine.

Fig. 2 is a detail view of the driving means for the cam shaft, which controls the movements of the carrier, the stitcher, and the book-turning mechanism.

Fig. 3 is a similar detail view of the cam for controlling the book-turning mechanism.

Fig. 4 is a similar view of the cam mechanism controlling the stitcher.

Fig. 5 is a plan view of the complete machine.

Fig. 6 is an end view of the machine, showing the driving and control mechanism for the folding table.

Fig. 7 is a detail view, partially in section, illustrating the book-turning mechanism at the point of grasping a book and removing the book from the carrier.

Fig. 8 is an elevational view of the mechanism, illustrated in Fig. 7, taken on the line 8—8 of Fig. 7.

Fig. 9 is an end elevational view of the book carrier member.

Fig. 10 is a view similar to Fig. 7, illustrating the book-turning mechanism on its upward movement.

Fig. 11 is a view similar to Fig. 10, showing the book-turning mechanism at the top, or upper end, of its swing.

Fig. 12 is a perspective view of one of the fixed fingers on the book-turning mechanism.

Fig. 13 is a view similar to Fig. 11, showing the book-turning mechanism on its downward movement.

Fig. 14 is a plan view of the carrier member with a book thereon.

Fig. 15 is an elevational view of the control and operating means for the book-grasping mechanism in the folding machine, in inoperative position, and also the counting mechanism.

Fig. 16 is a view similar to Fig. 15, showing the various members in operative position.

Fig. 20 is a detail view of the book-grasping mechanism, in position, with fingers grasping a book which has been delivered onto the folding table.

Fig. 21 is a view, similar to Fig. 20, showing the same mechanism in its book-releasing position.

Fig. 22 is a detail view of the stop and rolls for positioning the book under the folding blade.

Fig. 23 is a sectional view on the line 23—23 of Fig. 21.

Fig. 24 is a view of the finished book, as it leaves the machine, and

Fig. 25 is a sectional view on the line 25—25 of Fig. 24.

Referring now to the drawings in detail, in which line numerals refer to like parts throughout:

Figure 17:
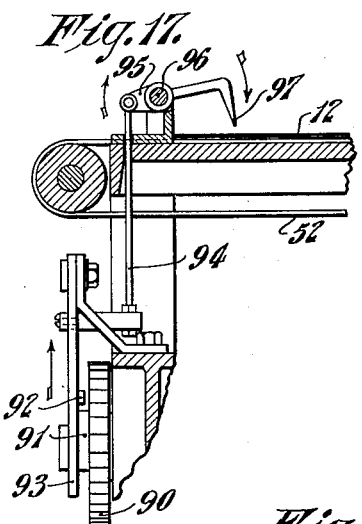
Fig. 17 is a sectional view on the line 17—17 of Fig. 15, illustrating the counting mechanism.

The frame 1 has secured thereto the stack table 10, upon which is piled the stack 11 of book material to be bound and folded into books. This material is arranged in groups, each group containing a plurality of flat filler sheets and preferably a colored cover sheet, the cover sheet of each group being uppermost, or on top of the filler sheets with which it is to be bound. An operator removes a group, or book, 12, from the stack 11 and places it upon the reciprocable carrier 15, by means of which the book 12 is carried under the stitching, or stapling mechanism 30, to the turning, or reversing, mechanism 40, which picks up the book 12, turns it over, and deposits it upon the carrier belt 50 with the cover down and the filler sheets on top of the cover. The book 12 is then carried to the folding table by means of the carrier belts 50 and 52, where it is grasped by the sliding finger mechanism 100 and pulled under the folding blade 61, which moves upward and downward of the folding machine 60. The book 12 is folded, by means of the blade 61, and squeeze rolls 62 and 63, (see Fig. 19), and deposited on the delivery carrier belts 64, from whence it is delivered to the belt 140, by means of the stacking mechanism 130. These various movements and mechanisms, with others, will be explained and described in detail.

The movements of the reciprocable carrier member 15, the staple stitcher 30, and the book-turning mechanism 40 are controlled by the cam shaft 2, which is driven by means of the worm gear 3, worm 4, drive shaft 5, chain 6, speed control device 7, chain 8, from the motor 9. The reciprocable carrier 15 has secured thereto the rod 16, which is connected at 16', to the lever 17. This lever is pivotally secured to the frame 1 by means of the bracket 17' and is oscillated by means of the link 18, roll 19, and cam 20. The cam 20 is formed with steps 20' for imparting to the carrier 15 a plurality of spaced moves, or "jumps" in its forward movement, and a continuous, steady, return, or backward, movement. The movements of the book carrier 15 are cushioned by means of the air cylinder 21 and is movably supported on and guided by the rods 22, by means of the rollers 23. Secured to the carrier 15, (see Figs. 9 and 14,) are the end stops 24 and 25, the side stops 26, and the guide members 27, which co-operate to hold the unstitched books 12 on the carrier 15, during movements of the carrier, in a forward direction. The carrier 15 is longer than the book 12, and the distance between the stops 24 and 25 is greater than the length of the book 12, as clearly shown in Fig. 14. Thus, the books 12 are permitted to shuck back and forth on the carrier 15, to a limited extent, during the intermittent or "jump" movements of the carrier. The result of this shucking movement is to eccentrically, or unevenly, space the distance between the metal stitches 31, relative to the book 12, as shown in Fig. 14. This eccentric spacing is advantageous in piling, or stacking, the finished books, as they do not "build up" so fast on the folded side, if the stitches of each book do not come directly above the stiches in the book beneath. During each period of rest, between the jumps of the carrier 15, in its forward movement, the stitching mechanism 30 is operated by means of the clutch control rod 32, lever 33, and cam 34, shown in Fig. 4. The lever 33 is pivotally secured to the frame 1 at 35, and adjustment is provided, by means of the slot 36, formed in the end 37 of the lever 33. As will be noted in Fig. 4, the cam 34 is formed with a period of rest, during which the stitcher is inoperative. This period coincides with the backward movement of the book carrier 15.

At the extreme forward movement of the carrier 15, the book 12 is picked up and drawn from the carrier 15, by the mechanism 40. This mechanism (see Fig. 3) is controlled and operated by the cam 41, lever 42, rod 43, rack 44, pinion 45, and spring 46, secured to the rack 44 and frame 1. The spring 46 holds the lever 42 against the cam 41. The arms 47 are firmly secured to the frame 1, in any suitable manner, and projecting upwardly, have bearings 48, formed at their upper ends, in which is pivotally supported the shaft 49. The shaft 49 has secured thereto the arms 51, to which are secured the two square shafts 53 and 54. The shaft 53 is fixedly secured to the arms 51, and the shaft 54 is rotatably mounted in the arms 51. The shaft 54 has secured thereto the fixed finger elements 57, (see Fig. 10), by spot welding, or other suitable means, the finger elements 54' being formed with the downwardly extending lip portion 55 and the U-shaped guide member 56. Fingers 57, secured to the rotatable shaft 54, move within the guide members 56 to grip and release the book 12. A resilient pad 58, on the finger element 57, assists in gripping the book 12. The cam lever 59 impinges against the cam arm 65, which is pivotally secured to the bracket 66 on the fixed arm 47, on the downward movement of the arms 51, to raise the finger element 57 and release the book 12. The adjustable stop screw 67 secured in the bracket 66 is engaged by the arm 47, to limit the downward movement of the arms 51. The adjustable stop screw 68, secured to the bracket 69, on the rotatable shaft 54, engages against the end of the carrier 15 to cause the finger element 57 to close and thereby grip the book 12, as shown in Fig. 7. The operation is as follows: when the carrier 15 approaches the extreme forward position, indicated in Fig. 7, the curved portion 55 of the finger 54', slides under the book 12, thereby raising the forward edge of the book 12 above the stops 24. At the same time, the fingers 57 are forced down upon the top of the book 12, by the engagement of the screw 68, against the carrier 15, thus the book 12 is gripped firmly between the fingers 54' and the fingers 57. The carrier then starts its return movement, and the arms 51 are raised by the cam 41, rack 44 and pinion 45, thus dragging the book 12 away from the carrier 15, and onto the belt 50, as shown in Fig. 10. The fingers are maintained in closed position on the upward movement of the arms 51, as the cam 65 is permitted to raise by its pivotal support, as the lever 59 passes by it, as shown in Fig. 10. At the top of the movement of the arms 51, the belts 50 have carried the opposite end of the book 12 forward, until the position of the book 12 on the belts 50 is reversed, that is, with the cover below instead of on top. This position is illustrated in Fig. 11. On the downward movement of the arms 51, as illustrated in Fig. 13, the lever 59 impinges against the cam 65, thus raising the fingers 57 and releasing the book 12, which is carried along by the belts 50 and then picked up by the belts 52, and carried onto the table 70 of the folding machine 60.

The folding machine 60 and table 70 are of standard make. The folding blade 61 is raised and lowered in guides 71 by the crank 72, (see Fig. 6), which is secured to gear 72' on shaft 72'', meshed with the drive gear 73 on shaft 74. The shaft 74 is driven by sprocket and chain 75 from the gear box 7. The gear 76, on shaft 77, is also driven from the shaft 74.

Figure 18:
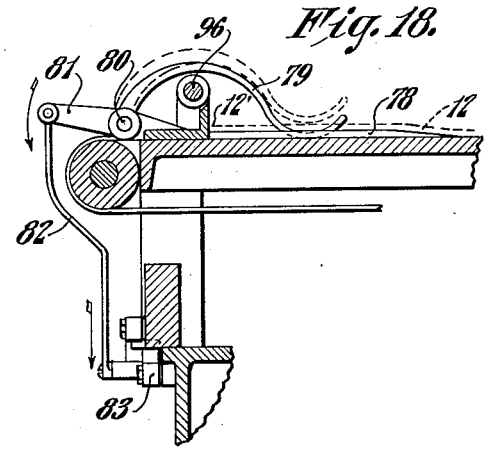
Fig. 18 is a sectional view on the line 18—18 of Fig. 15, illustrating the control for the book-grasping mechanism.

As the book 12 is carried onto the table 70, its forward edge 12' rides up onto the strip 78 and under the shoe 79 (see Fig. 18), thus raising the shoe 79 into the dotted position shown. The shoe 79 is pivotally supported on the shaft 80, to which is secured the arm 81. The link 82 is secured to the arm 81 and to the latch 83. (See Fig. 15.) This latch 83 is normally engaged in the notch 84 in the cam slide 85, thus holding the cam slide 85 in an inoperative position, with the cam roll 86 out of engagement with the cam 87 on the shaft 77. As the shoe 79 is raised by the book 12, the latch 83 is released by the rod 82, thus permitting the cam roll 86 to be pulled into engagement with the cam 87 by the spring 88, whereby the cam slide 85 is in operation only, when a book 12 is in proper position on the table 70. As the cam slide 85 moves forward and backward, actuated by cam 87 and roll 86, the pawl 89, secured to the cam slide 85, operates the ratchet 90, which is divided into any desired number of teeth, such as 25. When the ratchet 90 makes one complete revolution, the cam 91, which is secured to the ratchet 90, engages the pin 92, thereby raising the slide 93 (see Fig. 17), to which is secured the rod 94 that is pivotally secured to the arm 95 on the shaft 96. Stops 97, on the shaft 96, are moved downwardly into engagement with the table 70 by the action of the cam 91, thus forming a temporary offset stop for every twenty-fifth book. From this point, on to the delivery of the books from the machine, this book remains in offset position, thus dividing the delivered books into groups of twenty-five.

The cam slide 85 has secured thereto the link 98, to which, in turn, is secured the crank arm 99 on the vertical shaft 101. Secured to the top of the shaft 101, is the arm 102, which is attached at its opposite end to the slide 100 by means of the adjustable link member 103. As the cam slide 85 is pulled back by the spring 88, the slide 100 is moved forward across the table 70 into position for gripping a book 12 by action of the link 98, arm 99, shaft 101, crank 102 and link 103.

Figure 19:
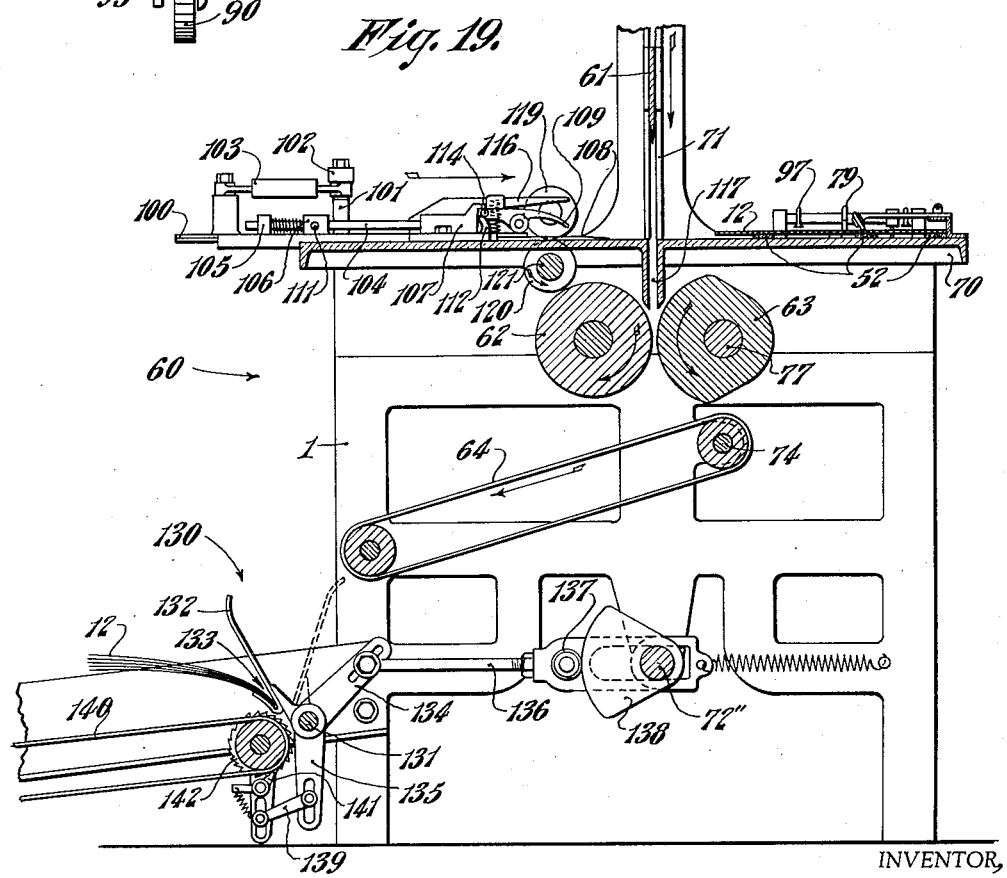
Fig. 19 is a cross sectional view through the folding machine on the line 19—19 of Fig. 5.

The rod 104 (see Fig. 20), is slidably secured on the slide 100 and in the bearing 105, and has secured thereon the sleeve 106 and latch 107. The forward end of the slide 100 is tapered to form the thin blade 108, just back of which is pivotally secured the book-gripping member 109. In normal, or inoperative position, the gripping member 109 is held in open position by the latch 107, which is forced against the member 109 by the spring 110 between the sleeve 106 and bearing 105, as indicated in Figs. 19 and 21. As the slide 100 is moved forward by the crank arm 102, the pin 111 in the sleeve 106 is engaged by the fixed stop 112, thereby releasing the gripping member 109 which is forced down onto the top of the book 12 by the spring 113, and in this position, the book 12 is gripped between the thin blade 108 and the pivotal gripping member 109. As the slide 100 moves backward, pulling the book 12 with it, the pin 114 in the gripping member 109 is engaged by the surface 115 on the fixed cam 116, which raises the member 109, releasing the book 12 and permitting the latch 107 to again engage the member 109 on the forward movement.

In order to provide for accurate centering of the book 12 over the slot 117, through which it is forced in the folding process by the blade 61, adjustable stops 118 are secured to the table 70; the book 12 is released by the gripping members 108 and 109, before it reaches the stops 118, and it is then carried against the stops 118 by the friction rolls 119 and 120. The rolls 120 are secured to the shaft 121, which is driven by sprocket and chain (not shown), from the shaft 77. The rolls 119 are idlers, and are supported by the arms 122, which are pivotally secured to the table 70 by means of the bearings 123. Adjustment of the pressure, exerted upon the book 12 by the rolls 119, is obtained by the adjustable counter-weights 124 on the rods 125, secured to the arms 122.

As the book 12 is forced down through the slot 117 in the table 70 by the blade 61, it passes between the squeeze rolls 62 and 63 and is then deposited on the carrier belts 64. A shaft 131, revolvably secured in the frame 1 below the delivery end of the belts 64, has secured thereon a plurality of book-receiving members 132, formed with the pockets 133. (See Fig. 19.) The cam lever 134 and ratchet arm 135 are also secured on the shaft 131. The lever 134 and shaft 131 are oscillated by means of the cam link 136, roll 137, and cam 138, secured to shaft 72''. In receiving position, the members 132 assume the position, shown in dotted lines in Fig. 19, in which position, the book 12 falls from the belts 64 into the pockets 133, folded edge down. The members 132 are then moved by the cam action into the full line position, shown in Fig. 19, in which position the book 12 falls upon the stack belts 140. As each book is deposited upon the stack belts 140, the ratchet arm 135, through the link 139 and pawl 141, moves the ratchet 142 one or more teeth, thus advancing the belts 140 a step at a time. In this manner, the books 12 are advanced along the belts 140, until they pile up against the stops 143, at which point they are removed by an operator.

The finished article is illustrated in Figs. 24 and 25. The filler sheet $12^2$, which was on the bottom of the group taken from the table 10, is on the inside with the other filler sheets $12^3$ folded around it, and the cover sheet $12^4$, which was on the top of the group taken from the table 10, is on the outside, folded around all of the filler sheets, and the whole is bound with the metal stitches 31. As shown in Fig. 24, the books may be divided into smaller units, if desired, by shearing on the dotted lines 144, in Fig. 24.

What I claim is:—

1. The combination in a book-stitching machine, of a table on which the books to be stitched are placed, a reciprocable stitching table on which a book is placed to be stitched, means for intermittently reciprocating said stitching table in one direction, means for stitching the book during the dwell period of the reciprocable table, means for withdrawing the stitched book from the stitching table and automatically reversing or turning the book over, a folding mechanism, and means for operating the folding mechanism to fold the reversed book.

2. The combination in a book-stitching machine, of a table on which the books to be stitched are placed, a reciprocable stitching table on which a book is placed to be stitched, means for intermittently reciprocating said stiching table in one direction, means for stitching the book during the dwell period of the reciprocating table, means for withdrawing the stitched book from the stitching table and automatically reversing or turning the book over, a folding mechanism, means for moving the stitched book to the folding mechanism, and means for operating the folding mechanism to fold the reversed book.

3. The combination in a book-stitching machine, of a table on which the books to be stitched are placed, a reciprocable stitching table on which a book is placed to be stitched, means for intermittently reciprocating said stitching table in one direction, means for stitching the book during the dwell period of the reciprocating table, means for withdrawing the stitched book from the stitching table and automatically reversing or turning the book over, a folding mechanism, means for moving the stitched book to the folding mechanism, said means including a reciprocable member having a gripping member which automatically grips and releases the stitched book, and means for operating the folding mechanism to fold the reversed book.

4. In combination in a blank book stitching machine, a movable table on which the book is placed to be stitched, means for stitching the book, means for stepping the said table along in one direction and for returning the same in a continuous motion in the return direction, said means comprising a drive shaft, a cam formed with a plurality of spaced steps alternating with dwell surfaces on its advance surface and a smooth unbroken return surface, and connecting means between the cam and the movable table.

5. In combination in a blank book stitching machine, means for stitching the book, means for reversing the book after being stitched, means for laterally spacing a book after a definite number of books have been stitched, and means for folding the book after the reversing and spacing operations.

6. In a blank book stitching machine, a stitching mechanism, means for reversing the book after being stitched comprising an arm movable in a vertical plane, a lip member carried by the arm, stops on the lip member for limiting the movement of the book, means for feeding a book to the lip member against the stops, a gripping pad co-operating with the lip member for retaining a book therebetween, means for actuating said pad to move it into a closed position, means for moving the pad into an open position to release the book, and means for simultaneously moving the book along during the movements of the arm, and actuating means for the arm.

7. In combination in a blank book stitching machine in which the books to be stitched are assembled with the cover sheets uppermost and the filler sheets beneath the cover sheets, means for inserting stitches in said books in unevenly spaced relation to each other, means for reversing the books to bring the cover sheet beneath the filler sheets, and means for folding the books.

8. In combination, in a blank book stitching machine in which the books to be stitched are assembled with the cover sheet uppermost and the filler sheets beneath the cover sheet, means for inserting stitches in said books in unevenly spaced relation to each other, means for reversing the books to bring the cover sheet beneath the filler sheets, means for folding the books, and means on said folding means for indicating a definite number of books.

9. In combination, in a book-stitching machine, means for reversing a stitched book comprising a carrier member, a swingable arm, book gripping means on the arm, means for moving the arm into a position to grip a book located adjacent one position of the arm, means for moving the arm away from said position as the carrier member carries or moves the book in a direction away from said position, and means operating the book-gripping means to release the book when the book has reached a reversed position.

10. In a gripping device for moving a book to be folded, a folding table, means on the table for operating the device, said device comprising a slidable member, a gripping finger on the slidable member, a latch on the slidable member for retaining the finger in an inoperative position, reciprocating means for operating the latch to release the finger for gripping a book to move it into position to be folded, and means for relatching the finger on its return movement prior to its gripping another book.

11. In combination in a folding mechanism, a folding table having a slot therein, a blade movable into and out of the slot, a reciprocable member on the table, the forward part of which is reduced to a thin blade for sliding under a book to be folded, a spring-actuated book-gripping finger carried by the reciprocable member adjacent and above said thin blade on the reciprocable member, a rod on the reciprocable member, a latch secured on the rod for retaining the finger in an inoperative position, means for releasing the latch when the thin blade passes under a book to permit the finger to grip a book to move it over the slot in the folding table, and means for relatching the finger to release the book after it is located over the slot and ready for its return movement prior to again gripping a book.

12. In combination in a blank book folding and counting mechanism, a slotted and horizontally arranged folding table, slidable means on the folding table having a single gripping finger for grasping and moving a book into a folding position, vertically operating folding means, means co-operating with the folding means for engaging a book as it is moved onto the table to position the same out of alignment after a definite number of books have been moved onto the folding table for placing one of the books out of line laterally relative to the other books for identifying the definite number of books.

13. In combination in a book-folding machine, a folding table, means for moving a book onto the folding table, a folding mechanism on the table, slidable means on the table having a thin edge for sliding under a book on the table, book-gripping means on the slide, means actuated by the book itself for releasing the said slidable means, said means comprising a cam and spring-actuated member that is released as the book passes onto the table, which member operates to move the slidable means into a position to grip the book, and means for drawing the gripped book into position to be folded.

14. In a machine of the kind described, a table member on which a book to be stitched is placed, a stitching device above the table, said table member being longer than the book, and means for moving the table member under the stitching mechanism in a step-by-step manner, whereby the book is caused to shuck or slide relative to the table for causing the stitching to be effected in an uneven manner.

15. In combination in a machine of the class described, a book-reversing mechanism comprising, a movable table which receives the book to be stitched, a stitching mechanism, a swinging arm, a stop member on the arm which engages the table when the arm is in its lowest position and the table is in its extreme forward position, means on the arm for gripping the book when the arm and table are in these positions, a conveyor belt onto which the stitched book is received as the arm is raised and the travel of the table reversed, and means for releasing the gripped book on the downward return movement of the arm.

16. In a book-stitching machine, a carrier member having a table part for receiving a book to be stitched, stop members on said carrier member spaced relatively farther apart than the length of a book to be stitched, a stitching mechanism, means for moving the carrier member through said stitching mechanism in a series of jump-movements alternated by dwell periods whereby a shucking movement between said stops is imparted to the book for the purpose of unevenly spacing the stitches inserted in the book by the stitching mechanism.

17. In a book-stitching machine, a carrier member, stop members on the ends of said carrier member, a stitching mechanism, means for moving said carrier member through said stitching mechanism in a series of jerky movements, a conveyor belt, means for gripping a book on said carrier member and drawing it onto said conveyor belt and turning it over, said means comprising a frame movable in a vertical plane, a fixed frame supporting said movable frame, means for actuating said movable frame in co-operation with said carrier member, a fixed shaft secured in said movable frame, finger elements secured on said fixed shaft so formed as to lift the edge of a book on said carrier member over said stop members as the finger elements pass under the edge of a book, a rotatable shaft secured in said movable frame, finger elements secured on said rotatable shaft and co-operating with the finger elements on said fixed shaft for gripping a book, means on said rotatable shaft for impinging against the end of said carrier member to rotate said shaft to close its fingers against the fingers on the fixed shaft for gripping a book, a trip device on said fixed frame, and means on said rotatable shaft co-operating with said trip device for raising the fingers on the rotatable shaft to release the gripped book after the conveyor belt has carried it beyond the movable frame, thus turning the book cover.

18. In a blank book folding machine having a folding table formed with a slot and a blade operating in and out of said slot to fold a book, means for conveying a book onto said folding table, a reciprocable slide on said table, means on said slide for gripping a book to position it across said slot to be folded, a lever arm connected to said slide, a second slide member connected to said lever arm, a cam roll on said second slide, a cam co-operating with said cam roll to actuate said reciprocable slide, latch means for holding said cam roll out of engagement with said cam, a trigger connected to said latch means whereby when a book conveyed onto said folding table slides under the trigger the latch means is released to permit the cam and cam roll to be engaged.

19. In a blank book stitching machine, means for stitching the same, a single horizontally located folding platform, means for moving the stitched book onto the single platform, a folding member above the platform, means for moving a book on the platform into the path of said folding member, said means comprising a reciprocable member, a single movable gripping jaw on the reciprocable member, a pin on the movable gripping jaw, a shouldered latch device on the reciprocable member, means for releasing the gripping jaw at a predetermined point of its travel to grip a book, cam means against which the said pin engages for resetting the latch for another gripping operation.

WELLINGTON GEORGE REYNOLDS.